DAVID CHALLINOR.
Improvement in Tools for Molding Glass.

No. 115,569. Patented June 6, 1871.

Witnesses:
R. C. Wrenshall
Thos. B. Kerr

Inventor:
David Challinor,
by Bakewell & Christy,
his Attys.

115,569

UNITED STATES PATENT OFFICE.

DAVID CHALLINOR, OF BIRMINGHAM, PENNSYLVANIA.

IMPROVEMENT IN TOOLS FOR MOLDING GLASS.

Specification forming part of Letters Patent No. 115,569, dated June 6, 1871.

*To all whom it may concern:*

Be it known that I, DAVID CHALLINOR, of the borough of Birmingham, in the county of Allegheny and State of Pennsylvania, have invented a new and useful Improved Tool for Manufacture of Hollow-Blown Glassware; and I hereby declare the following to be a full, clear, and exact description thereof, reference being had to the accompanying drawing making a part of this specification, in which—

Figure 3:
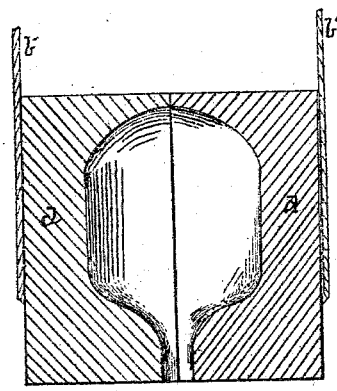
Figure 2:
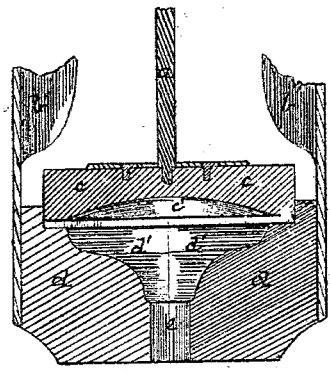
Figure 1:
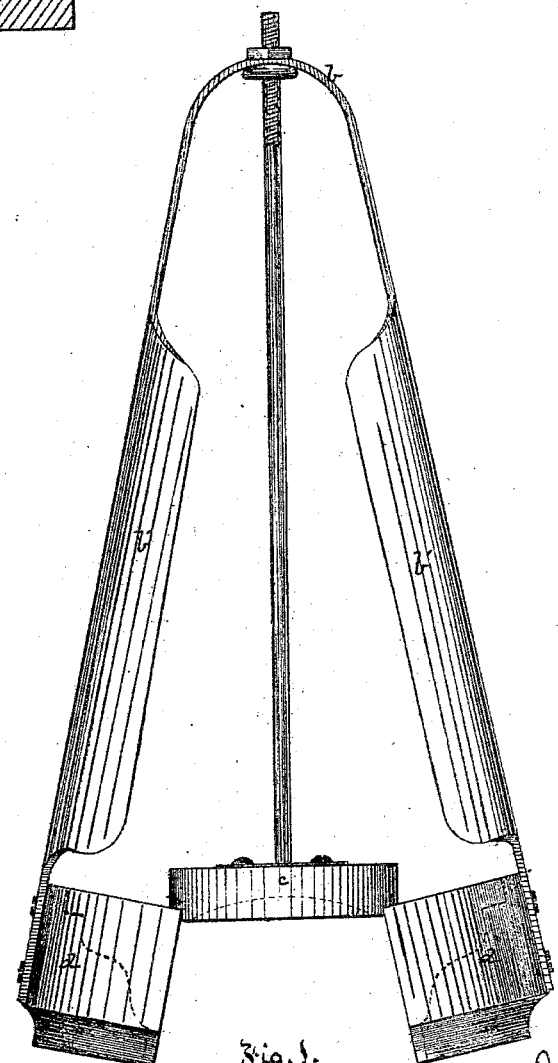

Figure 1 is a side view of my improved tool with the jaws open. Fig. 2 is a sectional view of the same with the jaws closed. Fig. 3 is a sectional view of a pair of jaws similarly operating, but with a cavity of different form.

Like letters of reference indicate like parts in each.

In connection with the manufacture of what is commonly known as silvered glassware, it is necessary to blow the article hollow, instead of pressing it either solid, as in door-knobs, or in bowl form, as in goblets. In the latter case the article is blown in an elongated globular form, and the outer end, after being heated, is turned in so as to make a hollow chamber all around and under the bowl in which the silvering solution is applied. The finishing of such articles on the outer face requires great care and skill, and, as the glass is thin, the bowl or hollow part is apt to be bent at the stem so as not to stand straight on the stem, and the articles are finished to a size and shape not uniform with each other, the accuracy of the work, in both respects, depending solely on the skill of the workman. By the use of my improved tool I give the desired finish to the outer face of the glass in the mold in which it is blown, and at the same operation. Then, if the mold is properly formed, the bowl or hollow part stands straight on its stem, and all articles made in the same mold are of a uniform size.

To enable others skilled in the art to make and use my invention, I will proceed to describe its construction and mode of operation.

The stem $a$ and bow $b$ (the latter being flexible and elastic, and the former being, when in use, rigidly attached thereto) and handles $b'$ are such as are used in tools for finishing the mouths of glass jars. Figs. 1 and 2 illustrate the construction of a tool designed for making door-knobs, window-knobs, and similar hollow articles. On the end of the stem $a$ is a die or mold-plate, $c$, having a face, $c'$, such as will give the desired form to the outer face or end of the knob. On the ends of the handles $b'$ is a pair of jaws, $d$, each having a cavity, $d'$, such that when the jaws are closed together the cavities $c'$ $d'$ $d'$ will give the mold-cavity desired, as in Fig. 2. Leading from the mold-cavities $d'$, and cut out of the inner faces of the jaws $d$, is the stem-cavity $e$, of the size and shape desired in the stem or shank of the knob.

The operation, then, is as follows: One workman takes the tool in his hand in the usual way. Another gathers on the end of his pipe the desired amount of molten glass, and after preparing it in the usual way, inserts the glass between the jaws $d$, when the jaws are closed with the glass in the cavities formed by the jaws $d$ and mold-plate $c$. The blowing is now done in the usual way, and at the same time the pipe, with the glass adhering thereto, is rolled rapidly along any suitable table or platform, the pipe and tool being horizontal, and the workman carrying the tool along forward or backward as the pipe rolls either way. The glass article in process of formation is thus caused to revolve rapidly against the cavity-faces of the jaws $d$ and plate $c$, and thus receives the requisite finish. As the shank or stem is formed in the cavity $e$, it must be, when made, exactly in line with the axis of the article made. The jaws are then allowed to open, which they do by the spring action of the bow $b$. The article is taken out, broken off the pipe, and is ready for silvering. In making double-shell articles, such as goblets, salt-cellars, &c., I prefer to dispense with the plate $c$ and make the cavities complete in the jaws $d$, as shown Fig. 3. In this case the mold-cavities are much longer than the article to be made. The operation of blowing and polishing is the same as above described. The article produced is of cylindrical form, tapered or rounded at the outer end. The latter is then heated and worked back in, so as to form the inner shell of the goblet, between which and the outer shell, and through the hole formed in the stem by blowing, the silvering solution is applied. Instead of the bow $b$, a pair of arms may be used, hinged or jointed at the outer end, and a spiral or other suitable spring may be arranged between them so as to force the jaws open at the proper time.

What I claim as my invention, and desire to secure by Letters Patent, is—

1. A tool for molding and finishing blown glassware, consisting of a pair of jaws, $d\ d$, which close on each other, with suitable cavities for giving the desired shape to the article to be blown, and the jaws being attached to the handles $b'$, or their equivalent, substantially as described.

2. A pair of jaws, $d\ d$, attached to a bow, $b$, in combination with a mold-plate, $c$, substantially as described.

In testimony whereof I, the said DAVID CHALLINOR, have hereunto set my hand.

DAVID CHALLINOR.

Witnesses:
A. S. NICHOLSON,
G. H. CHRISTY.